(12) United States Patent
An et al.

(10) Patent No.: US 8,533,159 B2
(45) Date of Patent: Sep. 10, 2013

(54) PROCESSING MATERIALIZED TABLES IN A MULTI-TENANT APPLICATION SYSTEM

(75) Inventors: Wen Hao An, Beijing (CN); Ning Duan, Beijing (CN); Bo Gao, Beijing (CN); Chang Jie Guo, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/165,885

(22) Filed: Jun. 22, 2011

(65) Prior Publication Data
US 2012/0030192 A1     Feb. 2, 2012

(30) Foreign Application Priority Data

Jul. 30, 2010   (CN) .......................... 2010 1 0244499

(51) Int. Cl.
G06F 17/30          (2006.01)
(52) U.S. Cl.
USPC ......................................... 707/648; 707/752
(58) Field of Classification Search
USPC ............................................... 707/648, 752
See application file for complete search history.

(56) References Cited

U.S. PATENT DOCUMENTS

| 6,745,224 B1* | 6/2004 | D'Souza et al. | 709/202 |
|---|---|---|---|
| 7,493,613 B2* | 2/2009 | D'Souza et al. | 717/173 |
| 7,624,145 B2* | 11/2009 | Junuzovic et al. | 709/205 |
| 8,065,673 B2* | 11/2011 | D'Souza et al. | 717/173 |
| 2004/0221289 A1* | 11/2004 | D'Souza et al. | 718/102 |
| 2006/0070023 A1* | 3/2006 | D'Souza et al. | 717/104 |
| 2007/0250524 A1* | 10/2007 | Le | 707/102 |

FOREIGN PATENT DOCUMENTS

| CN | 1514366 A | 7/2004 |
|---|---|---|
| CN | 1794232 A | 6/2006 |
| CN | 101241503 A | 8/2008 |
| EP | 1675030 A1 | 6/2006 |

\* cited by examiner

*Primary Examiner* — Baoquoc N To
(74) *Attorney, Agent, or Firm* — Winstead, P.C.

(57) ABSTRACT

A method, system and computer program for processing materialized tables in a multi-tenant application system, wherein in the multi-tenant application system, a plurality of tenants share one or more basic-tables. According to the data access history information of the plurality of tenants, an update pattern analyzer analyzes the similarity of the update patterns for one or more basic-tables by the plurality of tenants. Furthermore, according to the similarity analyzed by the update pattern analyzer, a tenant grouping means groups the plurality of tenants into a plurality of tenant groups. Additionally, according to the tenant groups grouped by the tenant grouping means, a materialized table constructor constructs the tenant group materialized tables from the one or more basic-tables.

20 Claims, 9 Drawing Sheets

| TENANT/TIME | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| T1 | 0 | 0 | 0 | 0 | 0 | 0 | 0 | 0 | 0 | 0 | 0 | 0 | 100 | 0 | 0 |
| T2 | 0 | 0 | 0 | 0 | 0 | 0 | 0 | 0 | 0 | 0 | 0 | 0 | 220 | 0 | 0 |
| T3 | 0 | 0 | 0 | 0 | 70 | 0 | 0 | 0 | 0 | 0 | 0 | 0 | 0 | 0 | 0 |
| T4 | 0 | 0 | 0 | 0 | 0 | 0 | 0 | 0 | 0 | 0 | 0 | 200 | 0 | 0 | 0 |
| T5 | 0 | 320 | 0 | 0 | 0 | 0 | 0 | 0 | 0 | 0 | 0 | 0 | 0 | 0 | 0 |
| T6 | 0 | 0 | 0 | 0 | 0 | 200 | 0 | 0 | 0 | 0 | 0 | 0 | 0 | 0 | 0 |
| T7 | 0 | 0 | 0 | 0 | 0 | 0 | 0 | 0 | 300 | 0 | 0 | 0 | 0 | 0 | 0 |
| T8 | 0 | 0 | 0 | 0 | 0 | 0 | 0 | 0 | 0 | 0 | 0 | 110 | 0 | 0 | 0 |
| T9 | 0 | 0 | 0 | 0 | 0 | 0 | 0 | 0 | 200 | 0 | 0 | 0 | 0 | 0 | 0 |
| T10 | 0 | 110 | 0 | 0 | 0 | 0 | 0 | 0 | 0 | 0 | 0 | 0 | 0 | 0 | 0 |

| TENANT/TIME | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| T1 | 0 | 0 | 0 | 0 | 0 | 0 | 0 | 0 | 0 | 0 | 0 | 0 | 1 | 0 | 0 |
| T2 | 0 | 0 | 0 | 0 | 0 | 0 | 0 | 0 | 0 | 0 | 0 | 1 | 0 | 0 | 0 |
| T3 | 0 | 0 | 0 | 0 | 1 | 0 | 0 | 0 | 0 | 0 | 0 | 0 | 0 | 0 | 0 |
| T4 | 0 | 0 | 0 | 0 | 0 | 0 | 0 | 0 | 0 | 0 | 1 | 0 | 0 | 0 | 0 |
| T5 | 0 | 1 | 0 | 0 | 0 | 0 | 0 | 0 | 0 | 0 | 0 | 0 | 0 | 0 | 0 |
| T6 | 0 | 0 | 0 | 0 | 0 | 1 | 0 | 0 | 0 | 0 | 0 | 0 | 0 | 0 | 0 |
| T7 | 0 | 0 | 0 | 0 | 0 | 0 | 0 | 1 | 0 | 0 | 0 | 0 | 0 | 0 | 0 |
| T8 | 0 | 0 | 0 | 0 | 0 | 0 | 0 | 0 | 0 | 0 | 1 | 0 | 0 | 0 | 0 |
| T9 | 0 | 0 | 0 | 0 | 0 | 0 | 0 | 1 | 0 | 0 | 0 | 0 | 0 | 0 | 0 |
| T10 | 0 | 1 | 0 | 0 | 0 | 0 | 0 | 0 | 0 | 0 | 0 | 0 | 0 | 0 | 0 |

| TENANT GROUP | TENANT MEMBERS | TIME OF LARGE SCALE UPDATES |
|---|---|---|
| TG1 | T1,T2 | 13 |
| TG2 | T5,T10 | 2 |
| TG3 | T4,T8 | 12 |
| TG4 | T7,T9 | 9 |
| TG5 | T3 | 5 |
| TG6 | T6 | 6 |

FIG. 6A

| TENANT GROUP | TENANT GROUP MV | STATE | TENANT MEMBERS | TIME OF LARGE SCALE UPDATES |
|---|---|---|---|---|
| TG1 | EMPL_SALARY_TG1 | ENABLED | T1,T2 | 13 |
| TG2 | EMPL_SALARY_TG2 | ENABLED | T5,T10 | 2 |
| TG3 | EMPL_SALARY_TG3 | DISABLED | T4,T8 | 12 |
| TG4 | EMPL_SALARY_TG4 | ENABLED | T7,T9 | 9 |
| TG5 | EMPL_SALARY_TG5 | ENABLED | T3 | 5 |
| TG6 | EMPL_SALARY_TG6 | DISABLED | T6 | 6 |

FIG. 6B 2009-11-13 16:23:51,640 [080-Processor25] DEBUG java.sql.Connection-{conn-100001-T1} Preparing Statement: insert salary values (?,?,?)2009-11-23 1 6:23:51,640 [080-Processor22] DEBUG java.sql.Connection- {conn-100000-T2} Preparing Statement: delete from salesorder  where sid = ?
2009-11-13 16:23:51,781 [080-Processor19] DEBUG java.sql.Connection-{conn-100005-T1} Preparing Statement: select id, houseId, housetype, jubaotype, creationdate, loginId, checked, shenheUser   from t_jubao     where (   loginId = ?     and housetype = ?)
2009-11-13 16:23:51,781 [080-Processor20] DEBUG java.sql.Connection-{conn-100001-T1} Preparing Statement: insert salaryitem values (?,?,?,?,?)
2009-11-13 16:23:51,828 [080-Processor15] DEBUG java.sql.Connection-{conn-100012-T2} Preparing Statement: insert into customer (uid, start, end, city, district, location, address, style, totalPrice, area, floor, floors, name, phone, mobile, decoration, comments, publishDate,    publishDateFormat, agencyValidate, ruleName, laiyuan, chaoxiang, nianxian)   values (?, ?, ?, ?, ?,    ?, ?, ?, ?, ?,    ?, ?, ?, ?, ?,    ?, ?, ?, ?,    ?, ?, ?, ?, ?)
2009-11-13 16:23:51,859 [080-Processor16] DEBUG java.sql.Connection-{conn-100004-T2} Preparing Statement: insert salary values (?,?,?)
2009-11-13 16:23:51,984 [080-Processor19] DEBUG java.sql.Connection-{conn-100004-T2} Preparing Statement: insert salaryitem values (?,?,?,?,?)
2009-11-13 16:23:52,000 [080-Processor16] DEBUG java.sql.Connection-{conn-100021-T2} Preparing Statement: insert into customer (uid, start, end, city, district, location, address, style,    totalPrice, area, floor, floors, name, phone, mobile, decoration, comments, publishDate,    publishDateFormat, agencyValidate, ruleName, laiyuan, chaoxiang, nianxian)   values (?,?,?,?,?,    ?,?,?,?,?,    ?,?,?,?,?,    ?,?,?,?,    ?,?,?,?,?)
2009-11-13 16:23:52,156 [080-Processor15] DEBUG java.sql.Connection-{conn-100020-T2} Preparing Statement: select id, status, creationDate, dianhua, huxing, lianxiren, loucheng, mianji, quyu, shouji, userId, viewtimes, weizhi, xinxilaiyuan, type, chaoxiang, nianxian, quanshu, shoujia, city,  shehe, shenhe, zhuangxiu, jiaju, jibie, mianjied, zongceng, hot  from t_second_house where ( type = ?    and xinxilaiyuan = ?)    order by creationdate desclimit ?, ?

PROCESSING MATERIALIZED TABLES IN A MULTI-TENANT APPLICATION SYSTEM

CROSS-REFERENCE TO RELATED APPLICATIONS

This application, claims priority under 35 U.S.C. §119(a) from Chinese Patent Application No. 201010244499.2, filed on Jul. 30, 2010, the contents of which are incorporated herein by reference.

TECHNICAL FIELD

The present invention relates to a multi-tenant application, particularly, to the management of a database in a multi-tenant application, and more particularly, to an apparatus for processing materialized tables in a multi-tenant application system.

BACKGROUND

A multi-tenant application system provides a multi-tenant application to users of software through multi-tenant (MT) technologies, i.e., running a single instance of a software application on a server of a service provider to provide software application services for a plurality of tenants (e.g., organizations like enterprises), thus reducing the costs of the development, deployment and operation of the software application.

A database is a systematic data organization for performing effective and reliable storage, retrieval and processing of the data. A database is composed of tables, in which there are rows of associated data. The access to and operation on the data are accomplished by a Structured Query Language (SQL) query.

A basic-database is a typical type of database, which includes business data, for example, a database store of daily sales data of a store, including commodities, sales volumes, sale prices and sale times.

Data analysis can be made according to the basic-database used by the SQL query. For example, calculating the total daily sales volume of each commodity from the perspective of the commodity; as time goes by, calculating the total monthly sales volume of each commodity, and calculating the total annual sales volume of each commodity.

In the context of the present invention, a basic-database is also called a basic-table BT.

A materialized view (MV), also called a materialized table, can be created from a basic-table. The materialized table is also a kind of table in a database, which can store intermediate data that is exported from the basic-table, e.g., the aforesaid total monthly sales volume of a commodity. The materialized table can be used to query, and by using the intermediate data in the materialized table, the amount of calculation required by the complex query can be reduced, and thus the query efficiency is improved.

In a massive multi-tenant application system, materialized tables are widely used to improve the efficiency of data query operations. In such a case, a plurality of tenants share one or more basic-tables as well as materialized tables corresponding to the basic-tables, and usually tenant identifiers are used in the basic-tables and the materialized tables to distinguish between the tenants to which the data belongs.

In the design of a materialized table in a database, the basic-table and the materialized table maintain data synchronization there between. When operations, such as addition, deletion and modification, are made to the basic-table, the materialized table can only be queried and retrieved from after refreshing and synchronization. During the process of refreshing and synchronization of the materialized table, the materialized table will be locked. At this time, a SQL query of the user cannot act on the materialized table. For example, when the sales volume of the commodity of a new day is added into the basic-table, the corresponding materialized table cannot be used, since the monthly sales volume of the commodity in the materialized table does not yet reflect the sales volume of the commodity of the newly-added day, and if the data in the materialized table is used, the result will be incorrect. After performing operations, such as addition, deletion, and modification, to the basic-table, the materialized table can only be used after its data is synchronized with the data of the modified basic-table. For example, according to the modified basic-table, a materialized table is exported or generated again so that the total monthly sales volume of the commodity of the materialized table includes the total sales volume of the newly-added day.

In a multi-tenant application system using materialized tables, different tenants may have different update patterns for a shared basic-table, e.g., performing update operations of data addition, deletion or modification on the basic-table at different times and/or in different frequencies. If there are many tenants sharing the basic-table and the materialized table, then at any time, there may be tenants performing update operations on the common one or more shared basic-tables. Since a materialized table corresponds to a plurality of basic-tables, from the perspective of the materialized table, the update rate of the basic-tables is always very high. As a result, the refreshing probability of the materialized table is high, and the frequency of it being locked is also high. This makes the tenants almost unable to use the materialized table to improve the query efficiency, thus affecting the speed of business operations by the tenants.

BRIEF SUMMARY

In one embodiment of the present invention, a method for processing materialized tables in a multi-tenant application system, wherein in the multi-tenant application system, a plurality of tenants share one or more basic-tables, the method comprises, according to data access history information of the plurality of tenants, analyzing a similarity of update patterns for the one or more basic-tables by the plurality of tenants. Furthermore, the method comprises, according to the similarity of update patterns analyzed, grouping the plurality of tenants into a plurality of tenant groups. In addition, the method comprises, according to the plurality of tenant groups, constructing, by a processor, tenant group materialized tables from the one or more basic-tables.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 7 illustrates a part of the log contents as the source of the history information in accordance with an embodiment of the present invention;

DETAILED DESCRIPTION

Embodiments of the present invention will now be described with reference to the accompanying drawings. In the following description, numerous details are described to enable the present invention to be fully understood. However, it is obvious to those skilled in the art that the realization of the present invention can be without some of these details. In addition, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are illustrative, rather than elements or limitation of the appended claims, unless explicitly stated otherwise in the claims.

Figure 1:
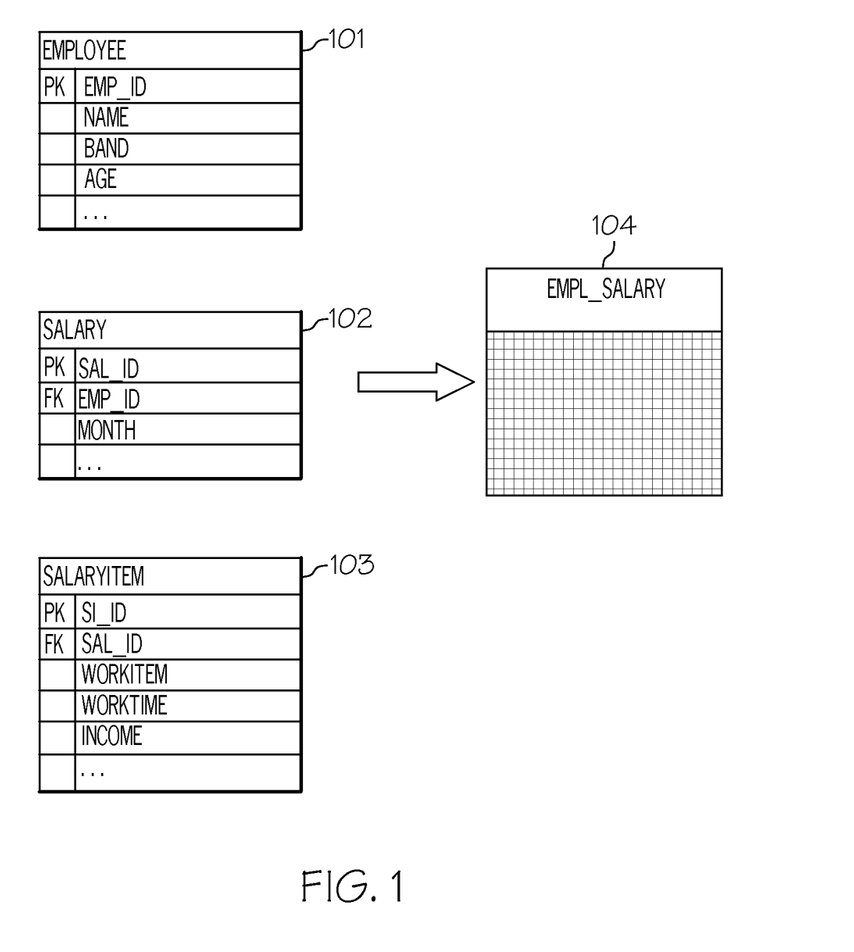
FIG. 1 illustrates the relationships between basic-tables and a materialized table in accordance with an embodiment of the present invention.

Referring to FIG. 1, it exemplarily illustrates the relationship between basic-tables and a materialized table in accordance with an embodiment of the present invention.

The left side of FIG. 1 illustrates basic-tables BT 101, 102, 103, while the right side illustrates a materialized table MV0 104 corresponding to the basic-tables.

FIG. 1 exemplifies three basic-tables, i.e., "EMPLOYEE" (employee) 101, "SALARY" (salary) 102 and "SALARYITEM" (salary item) 103.

The attributes of the basic-table "EMPLOYEE" 101 include a primary key EMP_ID (employee identification), NAME (name), BAND (band) and AGE (age).

The attributes of the basic-table "SALARY" 102 include a primary key SAL_ID (salary identification), foreign key EMP_ID (employee identification) and MONTH (month).

The attributes of the basic-table "SALARYITEM" 103 include a primary key SI_ID (salary item identification), foreign key EMP_ID (employee identification), WORKITEM (work item), WORKTIME (work time) and INCOME (income).

The three basic-tables can be associated by primary and foreign keys. For example, the basic-table "EMPLOYEE" 101 is associated with the basic-table "SALARY" 102 by the primary key (PK) EMP_ID of the basic-table "EMPLOYEE" 101 and the foreign key (FK) EMP_ID of the basic-table "SALARY" 102; similarly, the basic-table "SALARY" 102 is associated with the basic-table "SALARYITEM" 103 by the primary key (PK) SAL_ID of the basic-table "SALARY" 102 and the foreign key (FK) SAL_ID of the basic-table "SALARYITEM" 103. Thus, the three basic-tables "EMPLOYEE" 101, "SALARY" 102 and "SALARYITEM" 103 can be associated, and a materialized table 104 can be constructed through such association.

The database schema definition language (DDL) is a language for describing real world entities to be stored in the database. A database system usually uses a DDL script to construct a materialized table.

The following is an example of a DDL script to create a materialized table MV0 104 named EMPL_SALARY using the above three basic-tables of EMPLOYEE 101, SALARY 102 and SALARYITEM 103.

CREATE TABLE EMPL_SALARY AS (SELECT E.NAME, S.MONTH, AMOUNT(I.INCOME), AMOUNT (I.WORKTIME) FROM EMPLOYEE E, SALARY S, SALARYITEM I WHERE E.EMP_ID=S.EMP_ID AND S.SAL_ID=I.SAL_ID)

Data Initially Deferred Refresh Deferred

The constructed materialized table MV0 104 is shown as the right side of FIG. 1. Materialized table 104 includes the following attributes (not shown): NAME, MONTH, AMOUNT (I.INCOME), AMOUNT (I.WORKTIME), wherein AMOUNT (I.INCOME) denotes the total income, AMOUNT (I.WORKTIME) denotes the total work time, and therefore, the contents of materialized table 104 contain someone (NAME)'s total income and total work amount in a month (MONTH).

Figure 2:
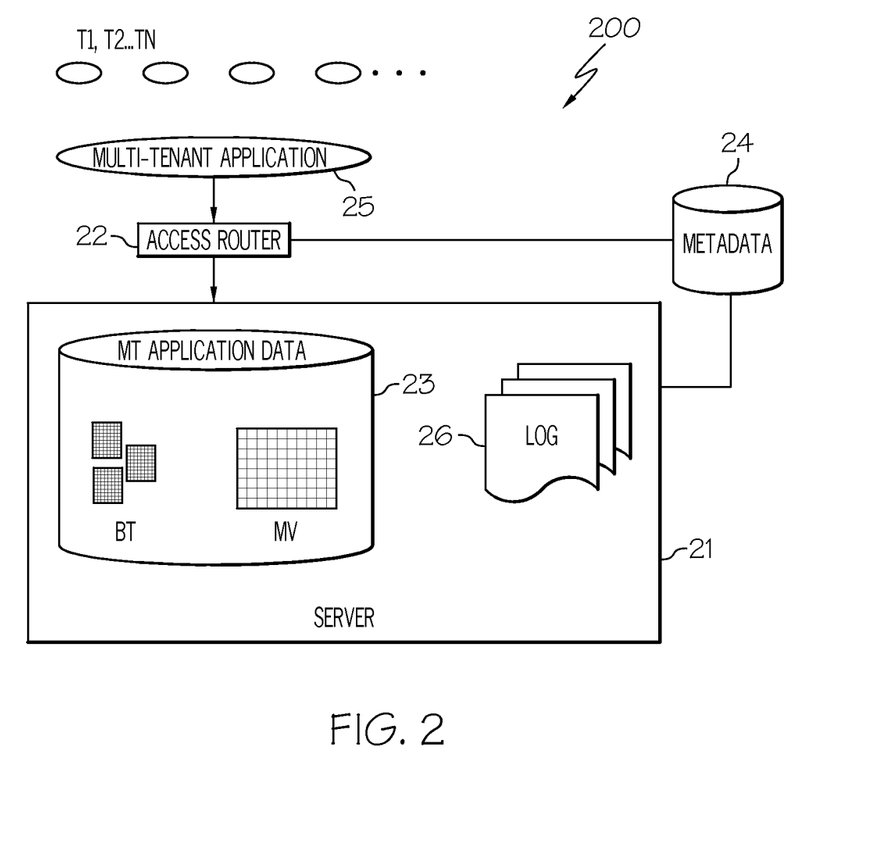
FIG. 2 illustrates the architecture of a multi-tenant application system in which embodiments of the present invention can be realized.

FIG. 2 schematically shows the architecture of a multi-tenant application system 200, in which various embodiments of the present invention can be realized. The architecture shown in FIG. 2 includes a server 21, an access router 22, a database 23 for storing multi-tenant application data, and a repository 24 for storing multi-tenant metadata, where the database 23 includes a basic-table BT and a corresponding materialized table MV shared by the plurality of tenants, T1, T2, . . . , Tn of the multi-tenant application 25.

The DDL script for constructing the materialized table can also be stored in, e.g., a database 23.

When a tenant Tn in the plurality of tenants T1, T2 . . . Tn of multi-tenant application system 200 send a request relating to accessing database 23 through multi-tenant application 25, access router 22 routes the tenant's request to server 21 to execute the requested service according to the metadata in repository 24.

The request relating to accessing the database issued by the tenant can be a query to the contents of database 23. For a complex SQL query, server 21 determines whether there is a materialized table available for the tenant's query request according to the identification of the tenant. If there is, server 21 performs the query on the materialized table MV; otherwise, server 21 performs the query on the basic-table BT. If the tenant's request is only a simple query requiring the basic data in the basic-table, server 21 only needs to perform the query on the basic-table BT shared by tenants.

The request relating to accessing the database issued by the tenant may also be to update the contents of database 23. Server 21 can perform the update operation on the basic-table BT according to the request, e.g., performing operations of addition, deletion or modification on the data in the basic-table.

During the process that server 21 performs update operations on the basic-table, the corresponding materialized table MV is locked, and other tenants cannot access the locked materialized table. After the update operation on the basic-table is accomplished, the materialized table will be synchronized with the basic-table. For example, the original materialized table is deleted, and a new materialized table is created or constructed based on the updated basic-table.

The operations performed by server 21 are preserved as history information. The data access history of tenants is also a part of the history information. One example of the history information is system log 26, e.g., the information recorded in log 26 on the tenants' access to the data, including the operation times, tenants involved and operation types.

Figure 3A:
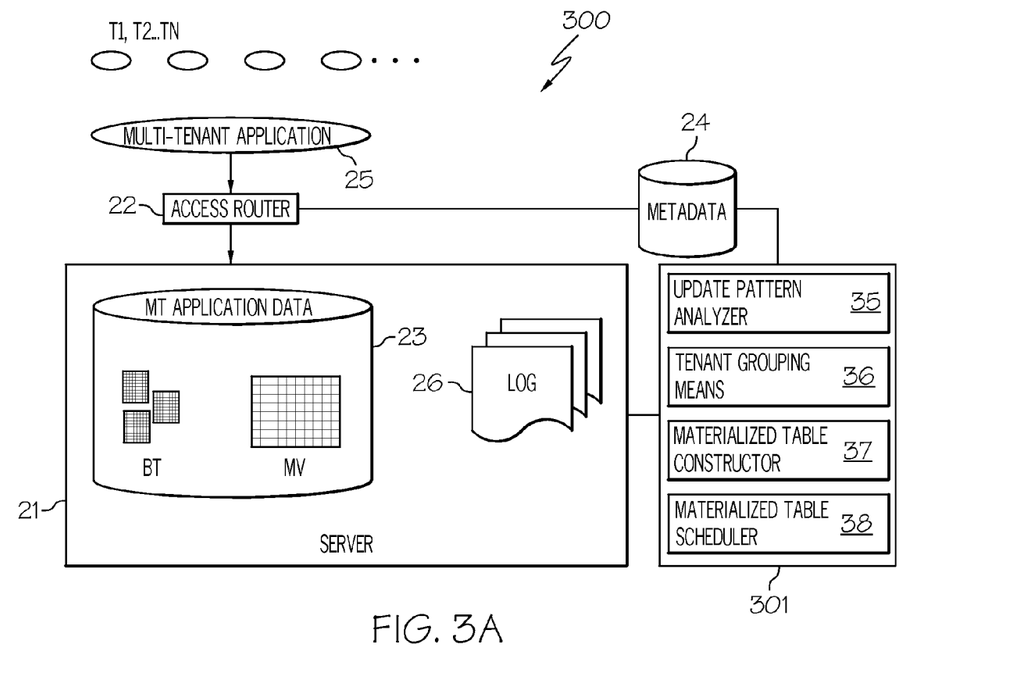
FIG. 3A illustrates a system for managing a materialized table in a multi-tenant application according to an embodiment of the present invention.

FIG. 3A illustrates a system 300 for managing a materialized table in a multi-tenant application according to an embodiment of the present invention.

System 300 for managing the materialized table in the multi-tenant application shown in FIG. 3A includes the same or equivalent components as in the architecture shown in FIG. 2, e.g., a server 21, an access router 22, a database 23 which includes basic-tables BT shared by a plurality of tenants, T1, T2 . . . Tn of the multi-tenant application system, a repository 24 for storing multi-tenant metadata, etc. Database 23 may further store a materialized table MV corresponding to the basic-tables BT shared by the plurality of tenants T1, T2 . . . Tn.

Similarly, the operations performed by server 21 are preserved as history information, e.g., recorded in log 26. For example, log 26 records the history information of data access by tenants, including the operation times, the tenants involved and the operation types.

As described above in conjunction with FIG. 2, the materialized table MV is shared by a plurality of tenants, and is associated with one or more basic-tables BT.

Compared with FIG. 2, system 300 of FIG. 3A further comprises an apparatus 301 for managing a materialized table in a multi-tenant application; the apparatus 301 comprises an update pattern analyzer 35, a tenant grouping means 36 and a materialized table constructor 37. In one embodiment, the components of apparatus 301 are software components which may reside in an application to be executed by a processor.

Therein update pattern analyzer 35 is for, according to the history information of data access of a plurality of tenants T1, T2 . . . Tn, analyzing the similarity degree of the update patterns (referred to as "update pattern" or "tenant's update pattern" for short herein) for the basic-table BT by the plurality of tenants.

In the following will be described specific implementations of update pattern analyzer 35 analyzing the similarity degree of the update patterns in more detail in conjunction with FIGS. 4A and 4B.

Referring again to FIG. 3A, tenant grouping means 36 is for, according to the similarity degree analyzed by update pattern analyzer 35, grouping the plurality of tenants T1, T2 . . . Tn into a plurality of tenant groups.

For example, tenant grouping means 36 groups the plurality of tenants into two tenant groups, TG1 and TG2 (not shown in FIG. 3A), where the tenants included in the tenant group TG1 have similar update patterns to each other; the tenants included in the tenant group TG2 have similar update patterns to each other. Of course, tenant grouping means 36 may also group the plurality of tenants into more than two tenant groups according to specific conditions.

Materialized table constructor 37 is for constructing a tenant group materialized table according to the tenant groups grouped by tenant grouping means 36.

Figure 3B:
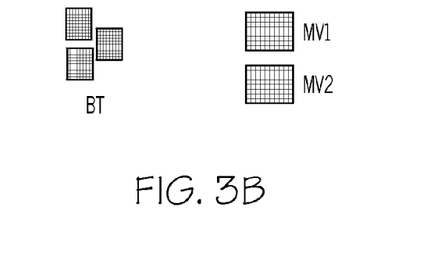
FIG. 3B illustrates the relationship between the tenant group materialized tables constructed and the basic-tables in accordance with an embodiment of the present invention.

For example, tenant grouping means 36 groups the plurality of tenants into two tenant groups, TG1 and TG2. According to such grouping, materialized table constructor 37 constructs two tenant group materialized tables MV1 and MV2 from the basic-tables BT, as shown in FIG. 3B in accordance with an embodiment of the present invention. The two tenant group materialized tables MV1 and MV2 correspond to the tenant groups TG1 and TG2, respectively.

The structures of the tenant group materialized tables MV1 and MV2 are the same as that of the materialized table MV, only the contents thereof differ according to the different tenant groups. For example, the tenant group materialized table MV1 only contains data related to the tenants in the tenant group TG1.

In the following will be further described specific implementations of materialized table constructor 37 constructing tenant group MVs according to tenant grouping in conjunction with FIGS. 6A and 6B.

Referring again to FIG. 3A, according to an embodiment of the present invention, the apparatus for managing materialized tables in a multi-tenant application further comprises a materialized table scheduler 38.

Materialized table scheduler 38 is for determining whether to enable or disable a corresponding tenant group materialized table based on the updates to the basic-table by the tenants.

According to an embodiment of the present invention, materialized table scheduler 38 determines, according to the determination that currently at least one tenant among the plurality of tenants will make large-scale updates to the basic-table, to disable the tenant group materialized table of the tenant group to which the tenant belongs. That is to say, if materialized table scheduler 38 determines that currently large-scale updates to the basic-table by the tenant will happen, it marks the state of the tenant group materialized table of the tenant group to which the tenant belongs from "enabled" to "disabled."

According to another embodiment of the present invention, after the at least one tenant among the plurality of tenants performs the large-scale updates to the basic-table, materialized table scheduler 38 determines to enable the tenant group materialized table, constructed by materialized table constructor 37, of the tenant group to which the tenant belongs. That is to say, after the tenant performs the large-scale updates to the basic-table, materialized table scheduler 38 constructs a tenant group materialized table of the tenant group to which the tenant belongs to replace the disabled tenant group materialized table, and marks the state of the newly constructed tenant group materialized table from "disabled" to "enabled."

According to the present invention, access router 22 of multi-tenant application system 300 may, in response to a data access request, e.g., an SQL request, from a tenant, according to the corresponding relationship between the groups and the tenant group materialized tables stored in the multi-tenant metadata, route the SQL request to the tenant group materialized table of the tenant group to which the tenant belongs.

Now specific implementations of update pattern analyzer 35 analyzing the similarity degree of the update patterns will be described in more detail in conjunction with FIGS. 4A and 4B.

It is discovered that for some tenant groups, their update patterns have certain similarities.

According to an embodiment of the present invention, the similarity degree of the update patterns analyzed by update pattern analyzer 35 includes adjacency in time of performing deletion, insertion or rewriting operations on records of the associated basic-tables of the materialized table.

In other words, in the embodiment, the update pattern, i.e., the mode of performing deletion, insertion or rewriting operations on records of the associated basic-tables of the materialized table, includes the timing for performing deletion, insertion or rewriting operations on records of the associated basic-tables of the materialized table.

Figure 4A:
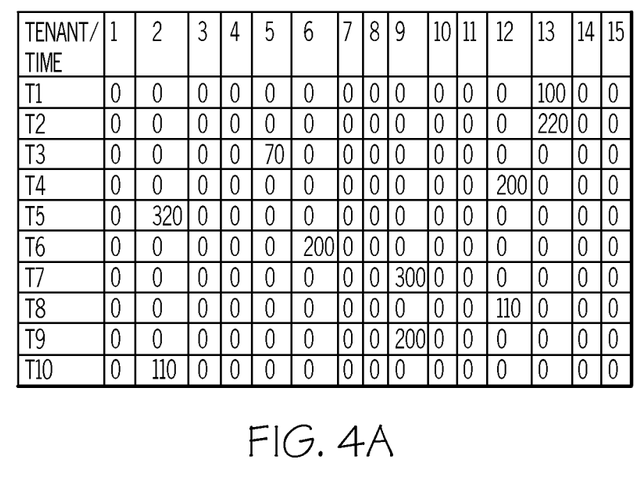
FIGS. 4A and 4B illustrate the data and diagram reflecting the update patterns of the tenants in accordance with an embodiment of the present invention.

Referring to FIG. 4A, in conjunction with FIG. 1, it schematically illustrates in the form of a table the update patterns of different tenants to the basic-tables BT shown in FIG. 1 in accordance with an embodiment of the present invention.

T1, T2 ... Tn in the first column of FIG. 4A denote different tenants, and 1, 2, ... 15 in the first row denote different times (or time periods), here assuming that they denote the first day, the second day ..., the $15^{th}$ day of each month. Each unit, except those in the first row and the first column, denotes the number of times of updates by a tenant to the basic-tables BT ("EMPLOYEE" 101, "SALARY" 102 or "SALARYITEM" 103) at some day. For example, as shown in the second column, on the second day, tenant T5 performs 320 updates, and tenant T10 performs 110 updates, and the rest of the tenants do not update on the second day. It can be seen from the table of FIG. 4A that, tenant T7 and tenant T9 perform large amount of updates on the $9^{th}$ day, and tenants T4 and T8 perform large amount of updates on the $12^{th}$ day.

The update patterns of tenants T1, T2 ... T10 can also be denoted by the diagram of FIG. 4B in accordance with an embodiment of the present invention. The horizontal coordinate of FIG. 4B denotes time, and the vertical coordinate of FIG. 4B denotes the number of times of updates. The diagram of FIG. 4B, from which the distribution of the tenant updates in terms of time can be observed intuitively, can be derived from the data in the table shown in FIG. 4A.

Figure 4B:
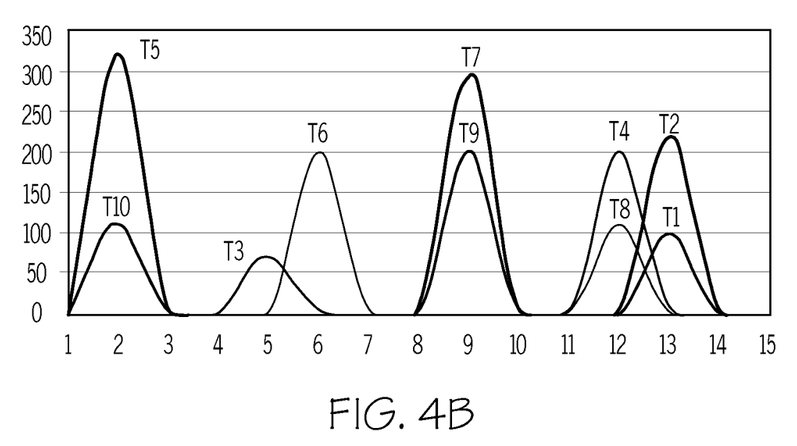

As can be seen intuitively from FIG. 4B, the curves to which tenant T5 and tenant T10 correspond overlap at time T2, which indicates that both tenant T5 and tenant T10 perform large amount of updates on the $2^{nd}$ day. Therefore, in terms of update times, the update patterns of tenant T5 and T10 are similar, or with higher similarity.

Also, the update patterns of tenant T7 and tenant T9 have high similarity, the update patterns of tenant T4 and tenant T8 have high similarity, and the update patterns of tenant T1 and tenant T2 have high similarity.

According to an embodiment of the present invention, the data access history information based on which update pattern analyzer 35 analyzes the similarity degree of the update patterns is obtained from the information on the tenants' data access operations recorded in log 26 (FIGS. 2 and 3).

For example, the data shown in FIG. 4A can be collected from the history information of previous operations on the database (basic-tables, materialized table) by the tenants.

In the following will be described in more detail specific implementations of collecting the data from log 26 of the computer system in conjunction with FIG. 7.

As known by those skilled in the art, according to the data, various means can be used to analyze the similarity degree of the update patterns of the tenants.

Figure 6A:
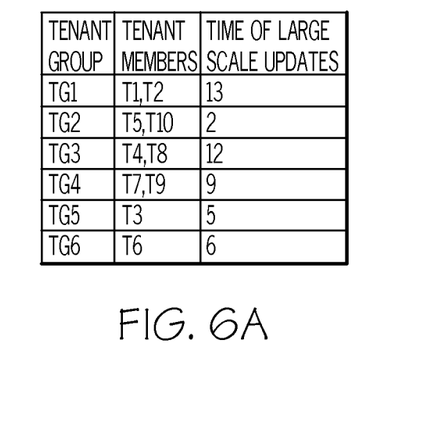
FIGS. 6A and 6B illustrate the processing of the data and diagram of FIGS. 4A and 4B in accordance with an embodiment of the present invention.

As described above in conjunction with FIG. 3A, tenant grouping means 36 of the present invention then, according to the similarity degree of the update patterns for the associated basic-tables of the materialized table by the plurality of tenants, groups the plurality of tenants into a plurality of tenant groups, as shown in FIG. 6A, in accordance with an embodiment of the present invention.

Referring to FIG. 6A, in conjunction with FIG. 3A, for example, tenants T1-T10 are grouped into six groups, TG1-TG6; tenants T1 and T2 are grouped into tenant group TG1; tenants T5 and T10 are grouped into tenant group TG2; tenants T4 and T8 are grouped into tenant group TG3; tenants T7 and T9 are grouped into tenant group TG4; tenant group TG5 only contains tenant T3 and tenant group TG6 only contains tenant TG6. The top table of FIG. 6A further illustrates that corresponding to tenant groups TG1-TG6, large-scale updates to the basic-tables happen on the $13^{th}$, $2^{nd}$, $12^{th}$, $9^{th}$, $5^{th}$ and $6^{th}$ days, respectively.

According to an embodiment of the present invention, tenant grouping means 36 may further store the information on the corresponding relationships between the tenants and the tenant groups and/or the times of large scale updates as shown in FIG. 6A in repository 24 as part of the metadata. The information can be used by materialized table constructor 37 or by access router 22.

As described above in conjunction with FIG. 3A, materialized table constructor 37 of the present invention may, then, according to the tenant groups grouped by tenant grouping means 36, construct corresponding tenant group materialized tables.

According to an embodiment of the present invention, materialized table constructor 37 may, according to the tenant groups, construct tenant group materialized tables by using a DDL script.

For example, materialized table constructer 37 may obtain the pre-defined DDL script, e.g., the DDL script described above in conjunction with FIG. 1, and modify the DDL script by using the tenant grouping information from MV grouping means 36 or from the metadata, and then construct tenant group materialized tables for the tenant groups by using the modified DDL script.

Figure 6B:
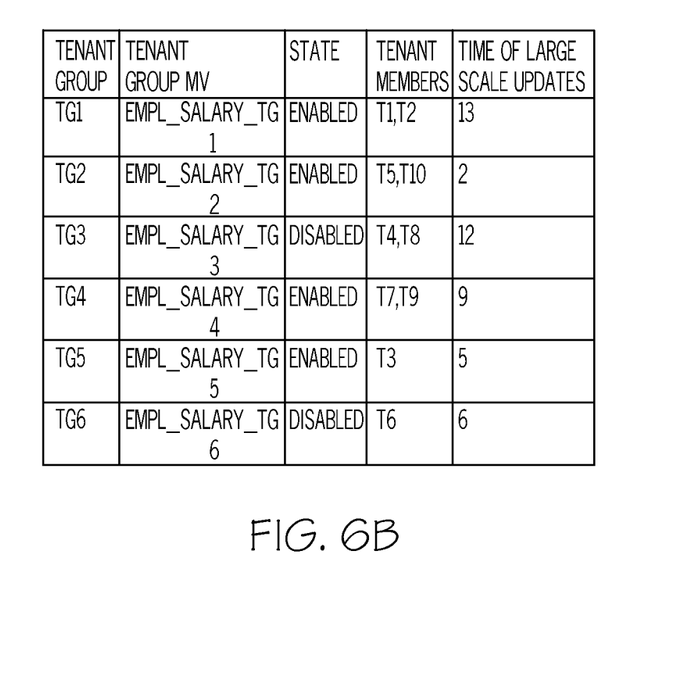

For example, referring to FIG. 6B, creating a tenant group materialized table EMPL_SALARY_TG1 for the tenant group TG1 including tenant T1 and T2 can be realized by the following modified DDL script:

CREATE TABLE EMPL_SALARY AS (SELECT E.NAME, S.MONTH, AMOUNT(I.INCOME), AMOUNT (I.WORKTIME) FROM EMPLOYEE E, SALARY S, SALARYITEM I WHERE E.EMP_ID=S.EMP_ID AND S.SAL_ID=I.SAL_ID) AND a.tenantID IN ('T1', 'T2') AND c.tenantID IN ('T1', 'T2')

Data Initially Deferred Refresh Deferred

The above modification to the DDL script is to add the code denoting the member tenants, tenant T1 and tenant T2, of the tenant group TG1, "AND a. tenant ID IN ('T1', 'T2') AND c.tenantID IN ('T1', 'T2')", so that the constructed tenant group materialized table EMPL_SALARY_TG1 only includes the data associated with the members of the tenant group TG1, i.e., tenant T1 and tenant T2.

For further example, the following is the code implementation of creating a tenant group materialized table EMPL_SALARY_TG2 for the tenant group TG2 including tenants T5 and T10.

CREATE TABLE EMPL_SALARY AS (SELECT E.NAME, S.MONTH, AMOUNT(I.INCOME), AMOUNT (I.WORKTIME) FROM EMPLOYEE E, SALARY S, SALARYITEM I WHERE E.EMP_ID=S.EMP_ID AND S.SAL_ID=I.SAL_ID) AND a.tenantID IN ('T5','T10') AND c.tenantID IN ('T5','T10')

Data Initially Deferred Refresh Deferred

Therein, the code "AND a.tenantID IN ('T5', 'T10') AND c.tenant ID IN ('T5', 'T10')" denote that the constructed tenant group materialized table EMPL_SALARY_TG2 only includes data associated with the members of the tenant group TG2, i.e., T5 and T10.

Similarly, tenant group materialized tables EMPL_SALARY_TG3-EMPL_SALARY_TG6 can be created for the other tenant groups TG3-TG6, thus creating 6 tenant group materialized tables, EMPL_SALARY_TG1-EMPL_SALARY_TG6. As shown in FIG. 6B, the 6 tenant group materialized tables correspond to the 6 tenant groups TG1 . . . TG6, respectively, in accordance with an embodiment of the present invention. As known by those skilled in the art, the constructed tenant group materialized tables EMPL_SALARY_TG1 . . . EMPL_SALARY_TG6 have the same structures as that of the materialized table EMPL_SALARY, but the contents are different, with a tenant group materialized table only involving the contents of the tenants in a corresponding tenant group. For example, EMPL_SALARY_TG1 only contain contents related to tenants T1 and T2.

Referring to FIG. 6B, in conjunction with FIG. 3A, according to an embodiment of the present invention, materialized table constructor 37 may record the information on the corresponding relationships between the tenant group materialized tables and the tenant groups shown in FIG. 6B into repository 24 as part of the metadata. The information can be used by materialized table scheduler 38 or by access router 22.

The table shown in FIG. 6B further has a column of data denoted with the title of "state" for denoting the states of the corresponding tenant group MV. If the state is "enabled," then this indicates that the corresponding tenant group MV has been synchronized with its basic-tables, and is usable. If the state is "disabled," then this indicates that the corresponding tenant group MV is not usable.

According to an embodiment of the present invention, after constructor 37 newly constructs a tenant group materialized table, it sets the state of the newly constructed tenant group materialized table as "enabled," and stores the state information in repository 24 as part of the metadata. The information can be used by materialized table scheduler 38 or by access router 22.

As described in above in conjunction with FIG. 3A, materialized table scheduler 38 is for, based on updates to basic-tables by tenants, determining whether to enable or disable corresponding tenant group materialized tables. Materialized table scheduler 38 may, when determining that large scale updates to a basic-table by a tenant will happen, mark the state of the tenant group materialized table of the tenant group to which the tenant belongs from "enabled" to "disabled"; after the tenant performs the large scale updates to the basic-tables, construct, by materialized table constructor 37, a tenant group materialized table of the tenant group to which the tenant belongs to replace the disabled tenant group materialized table, and the state of the newly constructed tenant group materialized table is marked from "disabled" to "enabled." The change of the state of the tenant group materialized table caused by materialized table scheduler 38 can also be recorded in repository 24 as part of the metadata.

An embodiment of the similarity of the update patterns of the tenants will be described and analyzed below in more detail. According to the embodiment, similarity of the update patterns of the tenant is analyzed by performing normalization on the data of the tenants updating basic-tables, e.g., as shown in FIGS. 4A-4B.

The normalization can be performed according to the following formula, so that after the normalization, the maximum value of the update times of each tenant at a specific time is 1, and the minimum value is 0.

$$\sum x_{ij} = \frac{x_{ij} - \min_i \{x_{ij}\}}{\max_i \{x_{ij}\} - \min_i \{x_{ij}\}}$$

In the above formula, $X_{ij}$ denotes that a tenant updates j times on the $i^{th}$ day; $\min\{x_{ij}\}$ denotes the minimum number of times of daily updates by a tenant within i days excluding the $i^{th}$ day; $\max\{x_{ij}\}$ denotes the maximum number of times of updates of a tenant within the i days, including the $i^{th}$ day.

Referring to FIG. 4A, for tenant T1, it updates 100 times on the $13^{th}$ day, with a maximum number of times of updates of 100, and at other times, its minimum number of times of daily updates is 0.

So, put the above values into the formula:
When i=13, $x_{ij}$=100, max$\{x_{ij}\}$=100, min $\{x_{ij}\}$=0,
so $\Sigma x_{ij}$=(100−0)/(100−0)=1;
when i=other values, $x_{ij}$=0, max$\{x_{ij}\}$=100, min $\{x_{ij}\}$=0,
so $\Sigma x_{ij}$=(0−0)/(100−0)=0.

After the normalization, the maximum value of the refresh times of tenant T1 is 1, and the minimum value is 0.

For the tenant T2, it updates 220 times on the $13^{th}$ day, with a maximum number of times of updates of 220, and the minimum number of times of daily updates is 0 at other times.

So, put the above values into the formula:
When i=13, $x_{ij}$=220, max$\{x_{ij}\}$=220, min$\{x_{ij}\}$=0,
So $\Sigma x_{ij}$=(220−0)/(220−0)=1;
When i=other values, $x_{ij}$=0, max$\{x_{ij}\}$=220, min$\{x_{ij}\}$=0,
So $\Sigma x_{ij}$=(0−0)/(220−0)=0.

Figure 5A:
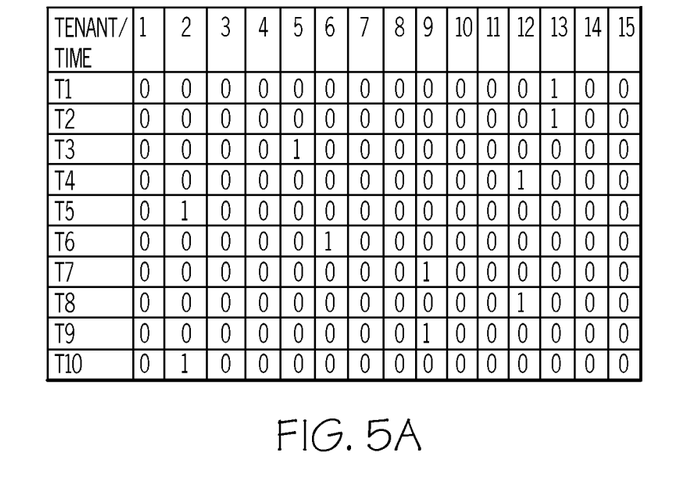
FIGS. 5A and 5B illustrate the data and diagram obtained by further processing of the data of FIG. 4A in accordance with an embodiment of the present invention.

Performing the same processing on the data of all the tenants in FIG. 4A can obtain the data table shown in FIG. 5A in accordance with an embodiment of the present invention. After the normalization process, the data table shown in FIG. 5A includes two values of 0 and 1, where value 1 denotes that large scale updates happens, and value 0 indicates that no updates happens, or the number of times of the updates is smaller than a predetermined threshold, and thus can be omitted.

Figure 5B:
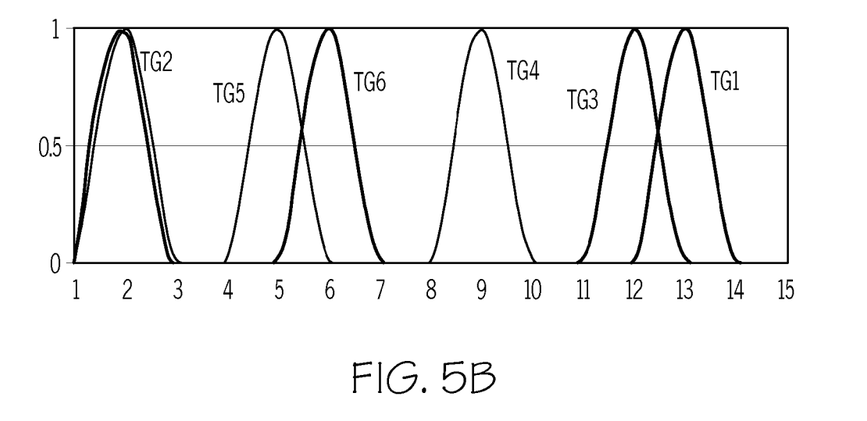

From the data table, the graph shown in FIG. 5B can be derived, where the horizontal coordinate denotes time, and the vertical coordinate denotes the number of times of updates that has been normalized in accordance with an embodiment of the present invention.

From FIG. 4B, the distribution of the tenants' updates in time can be visually observed. For example, referring to FIG. 5B, the curve denoting the update pattern of tenant T1 is TG1, and the curve denoting the update pattern of tenant T2 is also TG1.

In other words, after the normalization, the curve denoting the update pattern of tenant T1 overlaps the curve denoting the update pattern of tenant T2, which indicates that the update patterns of the two tenants are highly similar. Therefore, tenants T1 and T2 are put in the same tenant group TG1.

Now specific implementations are described for collecting these data from the log of the computer system in conjunction with FIG. 7.

As described above, when the present invention is implemented, information about the tenants' data access operations can be obtained from log 26 of the computer system for analyzing the similarity of the update patterns of the tenants.

It is a common technique for those skilled in the art to use the information in log 26 as the history information to analyze the operations of the computer user.

According to an embodiment of the present invention, update pattern analyzer 35 (FIG. 3A) first collects information about the tenant's data access operations from log 26 (FIG. 3A), to obtain part of the log contents as shown in FIG. 7 in accordance with an embodiment of the present invention. Referring to FIG. 7, in conjunction with FIGS. 1 and 3A, the log data shown in FIG. 7 records details of the tenants performing update operations on the database, including the time 71 when the operation happens (e.g., "2009-11-13 16:23:51, 640"), tenant 72 (e.g., "{conn-100001-T1}"), and operation 73 (e.g., "insert salary values"), where the type of the operation "insert salary values" is data insertion, which is an operation to perform updates to the basic-table (e.g., the basic-table of "SALARY" 102 shown in FIG. 1).

According to an embodiment of the present invention, a data table as shown in FIG. 4A can be constructed according to the above collected log data, for analyzing the similarity of the tenants' update patterns.

Various implementations of apparatus 301 (FIG. 3A) for managing a materialized table in a multi-tenant application of the present invention have been described through the above embodiments. Under the same inventive concept, the present invention also provides a method for processing materialized tables in a multi-tenant application system.

Figure 8:
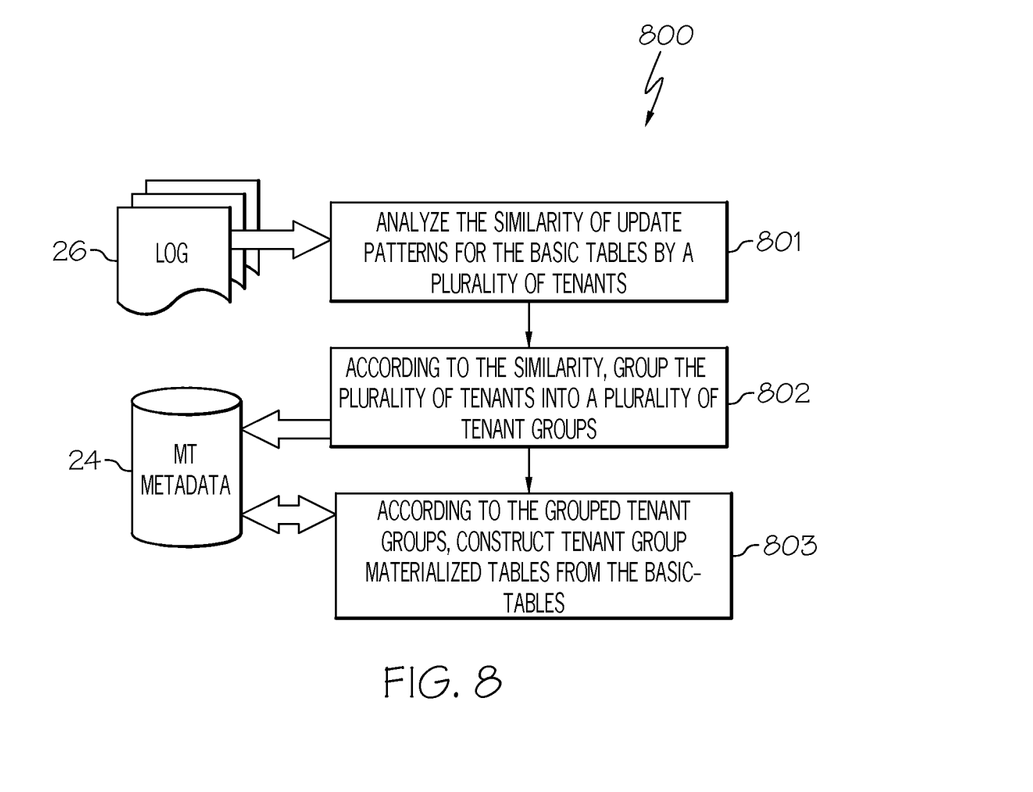
FIG. 8 is a flowchart of a method for processing materialized tables in a multi-tenant application system in accordance with an embodiment of the present invention.

FIG. 8 is a flowchart of a method 800 for processing materialized tables in a multi-tenant application system as shown in FIG. 3A in accordance with an embodiment of the present invention.

Referring to FIG. 8, in conjunction with FIG. 3A, in step 801, according to the plurality of tenants' data access history information, the similarity of the update patterns for the one or more basic-tables by the plurality of tenants is analyzed.

In step 802, according to the similarity analyzed by update pattern analyzer 35, the plurality of tenants are grouped into a plurality of tenant groups.

In step 803, according to the tenant groups grouped by tenant grouping means 36, the tenant group materialized tables are constructed from the one or more basic-tables.

In some implementations, method 800 may include other and/or additional steps that, for clarity, are not depicted. Further, in some implementations, method 800 may be executed in a different order presented and that the order presented in the discussion of FIG. 8 is illustrative. Additionally, in some implementations, certain steps in method 800 may be executed in a substantially simultaneous manner or may be omitted.

According to an embodiment of the present invention, the method is further for, based on updates to the one or more basic-tables by a tenant, determining whether to enable or disable the corresponding tenant group materialized table.

According to an embodiment of the present invention, the method is further for, based on the determination that currently at least one tenant in the plurality of tenants will perform large scale updates to a basic-table, disabling the tenant group materialized table of the tenant group to which the tenant belongs.

According to an embodiment of the present invention, the method is further for, after the at least one tenant in the plurality of tenants perform large scale updates to a basic-table, enabling the tenant group materialized table, constructed by materialized table constructor 37, of the tenant group to which the tenant belongs.

In the various embodiments of the above method, the similarity degree of the update patterns includes adjacency in time of performing deletion, insertion or rewriting operations on records of the associated basic-tables of the materialized table.

According to an embodiment of the present invention, in the various embodiments of the above method, a DDL script can be used to construct a tenant group materialized table corresponding to a tenant group.

According to an embodiment of the present invention, in the various embodiments of the above method, at least one of the following is stored: the corresponding relationships between tenants and tenant groups; the large-scale update times of tenants; the information about tenant group materialized tables being enabled or disabled. For example, they are stored as part of the multi-tenant metadata of the multi-tenant application system.

According to an embodiment of the present invention, in the various embodiments of the above method, the data access history information is the information of the data access operations of the tenants recorded in log 26 of the multi-tenant application system.

Apparatus 301 and its various embodiments described above can be used to illustrate and realize various embodiments of method 800 for processing materialized tables in a multi-tenant application system of the present invention. For simplicity, in the above description of the various embodiments of method 800, part of the contents repeating the above description of the corresponding apparatus 301 are omitted. Therefore, details of the apparatus can be learned by referring to the above description of the corresponding method.

The above description and illustration of apparatus 301 and method 800 for processing materialized tables in a multi-tenant application system and their embodiments are only exemplary, rather than limitation to the present invention. In other embodiments of the present invention, the apparatus may have more, less or different modules, and the connection or inclusion relationships between the modules can be different from that is described or illustrated.

Figure 9:
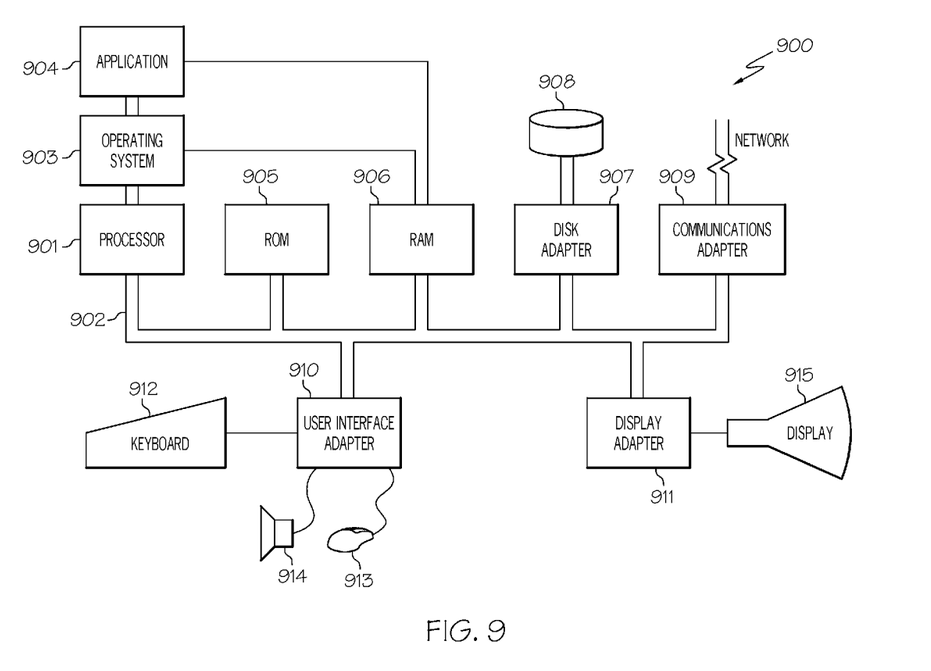
FIG. 9 depicts an embodiment of a hardware configuration of a computer system which is representative of a hardware environment for practicing the present invention.

FIG. 9 depicts an embodiment of a hardware configuration of a computer system 900 which is representative of a hardware environment for practicing the present invention. Referring to FIG. 9, computer system 900 has a processor 901 coupled to various other components by system bus 902. An operating system 903 may run on processor 901 and provide control and coordinate the functions of the various components of FIG. 9. An application 904 in accordance with the principles of the present invention may run in conjunction with operating system 903 and provide calls to operating system 903 where the calls implement the various functions or services to be performed by application 904. Application 904 may include, for example, an application for processing materialized tables in a multi-tenant application system as discussed above.

Referring again to FIG. 9, read-only memory ("ROM") 905 may be coupled to system bus 902 and include a basic input/output system ("BIOS") that controls certain basic functions of computer device 900. Random access memory ("RAM") 906 and disk adapter 907 may also be coupled to system bus 902. It should be noted that software components including operating system 903 and application 904 may be loaded into RAM 906, which may be computer system's 900 main memory for execution. Disk adapter 907 may be an integrated drive electronics ("IDE") adapter that communicates with a disk unit 908, e.g., disk drive.

Computer system 900 may further include a communications adapter 909 coupled to bus 902. Communications adapter 909 may interconnect bus 902 with an outside network (not shown) thereby allowing computer system 900 to communicate with other similar devices.

I/O devices may also be connected to computer system 900 via a user interface adapter 910 and a display adapter 911. Keyboard 912, mouse 913 and speaker 914 may all be interconnected to bus 902 through user interface adapter 910. Data may be inputted to computer system 900 through any of these devices. A display monitor 915 may be connected to system bus 902 by display adapter 911. In this manner, a user is capable of inputting to computer system 900 through keyboard 912 or mouse 913 and receiving output from computer system 900 via display 915 or speaker 914.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium includes an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network; including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Although the present invention has been illustrated and described with reference to preferred embodiments, those skilled in the art will understand that various changes both in form and details may be made thereto without departing from the spirit and scope of the present invention.

The invention claimed is:

1. A method for processing materialized tables in a multi-tenant application system, wherein the multi-tenant application system, a plurality of tenants share one or more basic-tables, the methods comprising:

According to data access history information of said plurality of tenants, analyzing a similarity of update patterns for said one or more basic-tables by said plurality of tenants;

According to said similarity of update pattern analyzed, grouping said plurality of tenants into a plurality of tenant groups;

According to said similarity of update patterns, constructing, by a processor, tenant group materialized tables from said one or more basic-tables.

2. The method as recited in claim 1 further comprising:

Based on updates to said one or more basic-tables by a tenant, determining whether to enable or disable a corresponding tenant group materialized table.

3. The method as recited in claim 2 further comprising:

Based on a determining that currently at least one tenant in said plurality of tenants will perform updates to a basic-table, determining to disable the tenant group materialized table of a tenant group to which the tenant belongs.

4. The method as recited in claim 2 further comprising:
After at least one tenant in said plurality of tenants performed updates to a basic-table, enabling the tenant group materialized table of a tenant group to which the tenant belongs.

5. The method as recited in claim 1, wherein the similarity of the update patterns includes adjacency in time of performing deletion, insertion or rewrite operations on records of an associated basic-table of a materialized table.

6. The method as recited in claim 1, wherein constructing a tenant group materialized table from said one or more basic-tables includes constructing the tenant group materialized table corresponding to a tenant group by using DDL script.

7. The method as recited in claim 1 further comprising:
Storing at least one of the following:
Corresponding relationships between said plurality of tenants and said plurality of tenant groups; and
Times for said plurality of tenant's updates.

8. A computer program product embodied in a hardware computer readable storage medium for processing materialized tables in a multi-tenant application system, wherein in the multi-tenant application system, a plurality of tenants share one or more basic-tables, the computer program product comprising the program instruction for:
According to data access history information of said plurality of tenants, analyzing a similarity of update patterns for said one or more basic-tables by said plurality of tenants;
According to said similarity of update pattern analyzed, grouping said plurality of tenants into a plurality of tenant groups;
According to said plurality of tenant groups, constructing tenant group materialized tables from said one or more basic-tables.

9. The computer program product as recited in claim 8 further comprising the programming instruction for:
Based on updates to said one or more basic-table by tenant, determining whether to enable or disable a corresponding tenant group materialized table.

10. The computer program product as recited in claim 9 further comprising the programming instruction for:
Based on a determination that currently at least one tenant in said plurality of tenants will perform updates to a basic-table, determining to disable to tenant group materialized table of tenant group to which the tenants belongs.

11. The computer program product as recited in claim 9 further comprising the programming instruction for:
After at least one tenant in said plurality of tenants performs updates to a basic-table, enabling the tenant group materialized table of a tenant group to which the tenant belongs.

12. The computer program product as recited in claim 8, wherein the similarity of the update patterns includes adjacency in time of performing deletion, insertion or rewrite operations on records of an associated basic-table of a materialized table.

13. The computer program product as recited in claim 8, wherein constructing a tenant group materialized table from said one or more basic-tables includes constructing the tenant group materialized table corresponding to a tenant group by using a DDL script.

14. The computer program product as recited in claim 8, further comprising the program instruction for:
Storing at least one of the following:
Corresponding relationship between said plurality of tenants and said plurality of tenant groups; and
times for said plurality of tenant's updates.

15. A system, comprising:
A memory unit for storing a computer program for processing materialized tables in a multi-tenant application system, wherein in the multi-tenant application system, a plurality of tenants share one or more basic-tables; and
Processor coupled to said memory unit, wherein said processor, responsive to said computer program, comprising:
According to data access history information of said plurality of tenants, circuitry for analyzing a similarity of update patterns for said one or more basic-tables by said plurality of tenants;
According to said similarity of update patterns analyzed, circuitry for grouping said plurality of tenants into a plurality of tenants into a plurality of tenant groups;
According to said plurality of tenant groups, circuitry for constructing tenant group materialized tables from said one or more basic-tables.

16. The system as recited in claim 15, wherein said processor further comprises:
Circuitry for based on updates to said one or more basic-tables by a tenant, determining whether to enable or disable a corresponding tenant group materialized table.

17. The system as recited in claim 16, wherein said processor further comprises:
Based on a determination that currently at least one tenant in said plurality of tenants will perform updates to a basic-table, circuitry for determining to disable the tenant group materialized table of a tenant group to which the tenant belongs.

18. The system as recited in claim 16, wherein said processor further comprises:
after at least one tenant in said plurality of tenants performs updates to a basic-table, circuitry for enabling materialized table of a tenant group to which the tenant belongs.

19. The system as recited in claim 15, wherein the similarity of the updates patterns includes adjacency in time of performing deletion, insertion or rewrite operations on records of an associated basic-table of a materialized table.

20. The system as recited in claim 15, wherein constructing a tenant group materialized table from said one or more basic-tables includes constructing the tenant group materialized table corresponding to a tenant group by using a DDL script.

* * * * *